Figure 1:
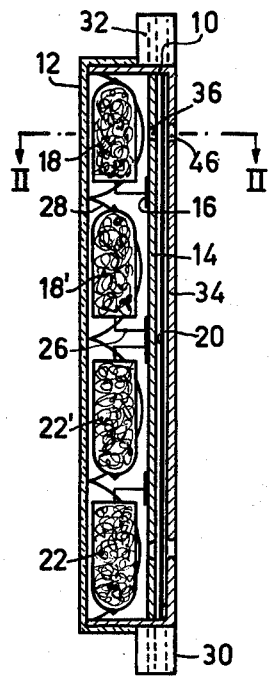

United States Patent [19]

Roelevink

[11] 4,198,673
[45] Apr. 15, 1980

[54] FLASH BULB UNIT

[75] Inventor: Bauke J. Roelevink, Terneuzen, Netherlands

[73] Assignee: U.S. Philips Corporation, New York, N.Y.

[21] Appl. No.: 885,298

[22] Filed: Mar. 10, 1978

[30] Foreign Application Priority Data

May 16, 1977 [NL] Netherlands .................... 7705364

[51] Int. Cl.² ............................................ G03B 15/02
[52] U.S. Cl. ....................................... 362/13; 362/249
[58] Field of Search ............................. 362/3, 13, 249

[56] References Cited

U.S. PATENT DOCUMENTS 4,017,728  4/1977  Audesse et al. ........................ 362/13

Primary Examiner—Stephen J. Lechert, Jr.
Attorney, Agent, or Firm—Robert S. Smith

[57] ABSTRACT

A flash bulb unit comprising a plate-shaped support on which an electric circuit is provided. The circuit includes a plurality of combustion flash bulbs. On the side of the support remote from the bulbs the unit has an opaque plate. The plate and the support are each provided with holes aligned with at least one flash bulb. A foil is disposed intermediate the plate and support which substantially blocks light rays until the bulb is flashed whereupon the heat melts the foil. The hole in the support increases in diameter from the side on which the bulb is disposed to the opposite side and is narrower on the side of the bulb than the hole in the plate. The part of the support situated adjacent to the hole in the plate has a color contrasting with that of the foil.

2 Claims, 4 Drawing Figures

U.S. Patent

Apr. 15, 1980

4,198,673

FLASH BULB UNIT

The invention relates to a flash bulb unit comprising a plate-shaped support on which an electric circuit is provided in which combustion flash-bulbs are incorporated, which unit has an opaque plate on the side of the support remote from the bulbs, the plate, as well as the support, is provided opposite to at least one flash bulb with a hole at the level of which between the support and the plate a foil is present which disappears upon flashing the bulb. Such a unit is disclosed in U.S. Pat. No. 3,980,877.

In the known flash bulb unit the housing is transparent and the opaque plate is present on the rear side in the housing. Upon flashing a bulb, the plastics foil is irradiated via the hole in the support present opposite the bulb so that the foil melts or shrinks away at the area. The disappearance of the foil is an indication that the flash bulb has been flashed.

A disadvantage of the known flash bulb unit is that the disappearance of the foil involves an optical change of the appearance of the rear side of the unit which is far from conspicuous.

It is the object of the invention to provide a flash bulb unit which gives a striking, significant and eye-catching indication that a flash bulb has been flashed.

In agreement herewith the invention relates to a flash bulb unit of the kind mentioned in the preamble which is characterized in that the hole in the support widens from the side of the bulb to the other side and on the side of the bulb is narrower than the hole in the plate, and that the part of the support opposite to the hole in the plate has a color which contrasts with that of the foil. The colored part of the support is mainly the wall of the widening hole in the support.

When flashing a flash bulb accommodated opposite to a hole in the support, the foil is irradiated via the hole in the support. The foil disappears by melting or shrinking over an area which is larger than the hole on the bulb side of the support. The widening hole in the support is no longer hidden from the eye. The side remote from the bulbs thus obtains a strikingly different appearance. The colored wall of the hole in the support is now visible through the hole of the opaque plate, and the color of said wall differs considerably from the colour of the originally visible foil. The new appearance indicates unambiguously and strikingly that the lamp has been flashed.

The contrasting color of the part of the support situated opposite to the hole in the plate, and notably of the wall of the hole in the support, is matched to the color of the foil. For example, the color of the support may be red or orange and the color of the foil may be black, green or blue. The contrasting color may be provided as a layer of paint on the surface of the support. Alternatively, (soluble) dyes in the support material may be used. The opaque plate preferably also has a color which stands out considerably from the color of the support.

The hole in the support may have any desidered shape, for example be circular, oval or rectangular, and may widen gradually or stepwise from the side of the bulb to the other side of the support which in general has a thickness of 1 to 2 mm. The hole in the opaque plate is preferably of the same shape as the hole in the support.

A preferred embodiment of the flash bulb unit according to the invention is characterized in that the widening hole in the support on the side of the bulb has a diameter of at least 0.8 mm and at most 4 mm and the diameter of the hole on the other side and the diameter of the hole in the plate are at least 0.8 mm larger.

The minimum dimension of the hole on the bulb side of the support is mainly determined by the manufacturing process of the support. The support which consists of a thermoplastic synthetic resin, for example polystyrene, polyvinyl chloride or polycarbonate, is usually manufactured according to an injection moulding process. In this process a mould is used which has a cam to create the widening hole in the support. For reasons of rigidity, such a cam usually has a minimum thickness of 0.8 mm. The maximum dimension of the hole on the bulb side of the support is preferably maintained as small as possible so as to restrict the loss of light.

The extent to which the hole in the support widens is determined by the optical requirements which are imposed upon the hole. It has been found that a readily observable indication for the flashed condition of the flash bulb is obtained already with a difference of 0.8 mm between the diameter of the hole on the side of the bulb and the diameter of the hole on the other side.

In determining the size of the hole in the opaque plate, mainly esthetical considerations play a part. The diameter is preferably not made larger than 5 mm.

The unit according to the invention may have a housing of which the side remote from the bulbs is transparent. The opaque plate, for example formed from a strip of paper or cardboard, is then arranged parallel to that transparent side. The housing may also have a side remote from the bulbs which is formed by the opaque plate which in that case forms part of the housing.

The foil present between the support and the plate may be of chlorinated polyethylene, propylene, or any other heat-sensitive synthetic resin and is preferably reinforced. Generally the foil has a thickness of 20 to 50 microns.

Figure 2:
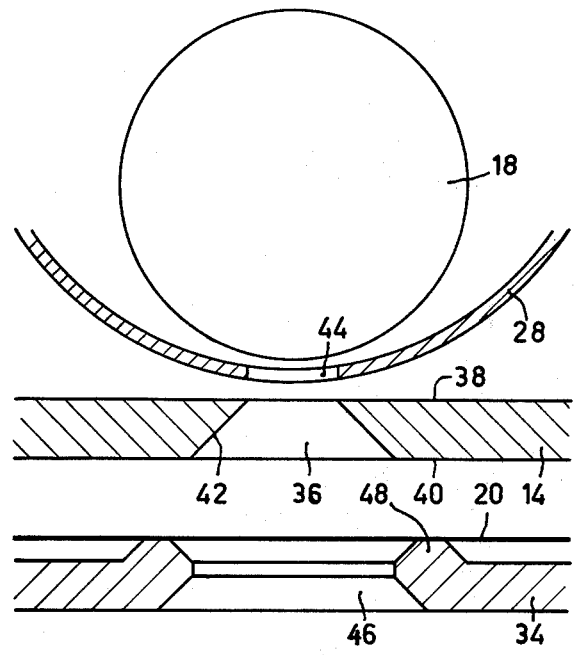
Figure 3:
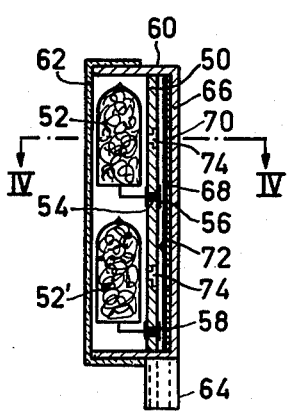
Figure 4:
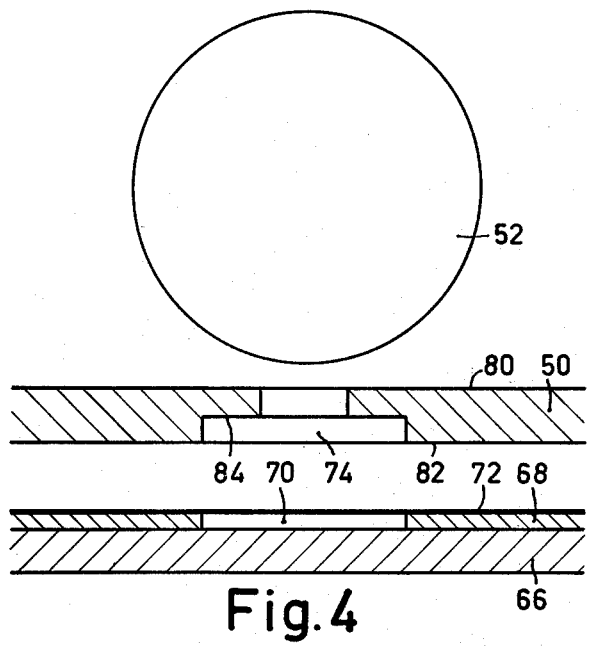

The invention will be described in greater detail with reference to the drawing, in which FIG. 1 is a sectional view of a first embodiment of the flash bulb unit according to the invention, FIG. 2 shows on an enlarged scale a part of the unit shown in FIG. 1 taken on the line II—II, FIG. 3 is a sectional view of a second embodiment of the flash bulb unit according to the invention, and FIG. 4 shows on an enlarged scale a part of the unit shown in FIG. 3 taken on the line IV—IV.

The flash bulb unit shown in FIG. 1 has an opaque plastic housing 10 of polystyrene which is closed by a transparent cover 12. Present in the housing 10 is a plate-shaped support 14 of polyvinyl chloride on which an electric circuit 16 is printed, of which only a few tracks are shown, to which circuit a first group and a second group of high voltage combustion flash bulbs are connected. Each group comprises four bulbs having a diameter of approximately 6 mm. 18 and 18' denote flash bulbs of the first group and 22 and 22' denote flash bulbs of the second group. The lamp poles 26 are connected mechanically to the support 14 and are connected electrically to a track of the circuit 16. Reflectors 28 are situated between the support 14 and the flash bulbs. The support 14 has two connection members 30 and 32 which can be arranged in a fitting aperture of a photocamera. The support has a thickness of approximately 1 mm.

By means of a piezo-element arranged in the camera, a voltage pulse can be applied to the electric circuit on the supports 14 via a connection member 30 or 32. The circuit is such that, when a pulse is applied to the circuit via the connection member 30, a flash bulb of the first group of high voltage flash bulbs is flashed. After having flashed all the flash bulbs of the first group, the unit is turned up and placed on the camera with the connection member 32, after which the flash bulbs of the second group can be flashed.

The housing 10 has a black rear plate 34 which is situated on the side of the support 14 remote from the flash bulbs. A black colored foil 20 of diaxially oriented polyethene having a thickness of 30 microns is situated between the plate 34 and the support 14.

The flash bulb unit according to this embodiment comprises a construction which indicates when all the flash bulbs of the first group and of the second group, respectively, of high voltage flash bulbs have been used. Said construction is situated opposite to the last flash bulb of the first group and the second group. The said lamps are denoted by 18 and 22. The construction according to the invention will be described in detail with reference to FIG. 2.

FIG. 2 shows a part of the flash bulb unit shown in FIG. 1. Visible is the flash bulb 18 with the part of the unit situated behind it. Opposite to the flash bulb 18 the support 14 has an axially truncated hole 36 which on the side 38 of the bulb has a diameter of 1.5 mm and on the other side 40 has a diameter of 3.5 mm. A red dye is incorporated in the support material and colors the support red, notably the wall 42 of the hole 36. The reflector 28 has an aperture 44 which is the same diameter as the diameter of the hole 36 on the side 38 of the bulb. The opaque rear plate 34 of the housing 10 which has a thickness of 0.8 mm is provided opposite to the flash bulb with a hole 46 the size of which corresponds to the hole 36 of the side 40 remote from the bulb. Around the hole 46 the plate 34 has an edge 48 against which the foil 20 bears.

In the unflashed condition of the bulb 18 the hole 46 in the rear plate 34 is covered by the black foil 20. When the bulb 18 is flashed, thermal radiation is incident on the foil via the aperture 24 and the hole 36 and melts away as a result of this through the edge 48 and makes the colored wall 42 visible. The wall 42 which is seen as a red ring forms a sharp contrast with the originally visible black foil 20 and with the black rear plate 34.

The flash bulb unit shown in FIG. 3 has a plate-shaped support 50 of polyvinyl chloride on which an electric circuit is provided. This support has a thickness of 1 mm. 52 and 52' denote combustion flash bulbs which are connected to the support 50. The flash bulbs are connected mechanically to the support 50 via metal lead through sleeves 54 and are connected electrically to the electric circuit of which only the tracks 56 and 58 are shown. 60 denotes a transparent plastic housing which is closed by a transparent cover 62 on the side of the bulbs.

The flash bulb unit has a connection member 64 with which the unit can be placed on a photocamera. The transparent rear plate 66 of the housing 60 is screened by an opaque paper sheet 68 of a few tenths of a millimeter thickness which opposite to the flash bulbs 52 and 52' has a hole 70 which in the unflashed condition of the bulbs is covered by a green foil 72. Opposite to the flash bulb the support 50 has a hole 74 which widens stepwise. This will be explained with reference to FIG. 4.

FIG. 4 shows on an enlarged scale a detail of the flash bulb unit shown in FIG. 3 taken on the line IV—IV. The hole 74 in the support 50 is rectangular and on the side (80) of the bulb has sides of 1.5 mm and on the other side (82) has sides of 3.5 mm which are equally large as the sides of the rectangular hole 70 in the plate 68. The wall 84 of the hole 74 in the support 50 has an orange layer of paint. When the lamp 52 is flashed the foil disappears to beyond the edges of the hole 70 and the orange wall becomes visible from the outside of the unit, as an indication that the flash bulb has been flashed. Between the flash bulbs 52 and 52' and the support 50 there is a reflector, if desired. Said reflector should have apertures in such manner that the foil 72 can be irradiated.

What is claimed is:
1. A flash bulb unit which comprises: a plate-shaped support, a plurality of bulbs carried on one side of said support, an electric circuit cooperating with said plurality of combustion flash lamps, and an opaque plate on the other side of said support, said plate, as well as said support each being provided with a hole, each of said holes being disposed in aligned relation to at least one of said flash bulbs, said unit further including a foil disposed intermediate said holes in said support and said plate said foil disappearing upon flashing of said one of said bulbs, said hole in said support having a greater diameter at said other side than at said one side of said support, the diameter at said one side being smaller than the diameter of said hole in said plate and the part of the support proximate to said hole in said plate having a color which contrasts with that of said foil.

2. A flash bulb unit as claimed in claim 1, wherein said hole in said support on said one side thereof has a diameter of at least 0.8 mm and at most 4 mm and the diameter of the hole on the other side and the diameter of the hole in said plate are at least 0.8 mm larger than said hole in said support on said one side.

* * * * *